United States Patent [19]

Shaumian

[11] 3,844,187
[45] Oct. 29, 1974

[54] MULTISPINDLE AUTOMATIC MACHINE

[76] Inventor: Grigor Arutjunovich Shaumian, Ananevsky pereulok, 5, kv. 63, Moscow, U.S.S.R.

[22] Filed: June 21, 1973

[21] Appl. No.: 372,414

[52] U.S. Cl. .................................................. 82/3
[51] Int. Cl. ............................................. B23b 3/34
[58] Field of Search ......................................... 82/3

[56] References Cited
UNITED STATES PATENTS

| | | | |
|---|---|---|---|
| 405,749 | 6/1889 | Tucker | 82/3 |
| 2,025,268 | 12/1935 | Bullard | 82/3 X |
| 2,618,044 | 11/1952 | Retz | 82/3 X |
| 3,364,788 | 1/1968 | Schubert | 82/3 |
| 3,693,485 | 9/1972 | Maurer | 82/3 |

Primary Examiner—Harrison L. Hinson
Attorney, Agent, or Firm—Eric H. Waters

[57] ABSTRACT

Cutting tool made as gang tools is located round the rotor and is fixed in position on the machine bed. The rotor that carries work spindles imparted rotation at a cutting speed from the main motion drive through the central gear wheel, has a rotative-motion drive of its own to impart circular feed motion. The circular feed motion drive of the rotor comprises the self-braking single-worm gear whose worm wheel is positively locked-in with the rotor, while the worm is kinematically assocated with the central gear wheel so that, regardless the direction of the rotor rotation, the tooth contact in the single-worm gear remains unaffected with the result that high rigidity of the system "tool-spindle-rotor" is established in the course of cutting.

2 Claims, 3 Drawing Figures

MULTISPINDLE AUTOMATIC MACHINE

The present invention relates generally to metal-cutting machines and more specifically to multispindle automatic machines for machining workpieces shaped as solids of revolution.

The invention can find widespread application in machining especially such workpieces as rings, sleeves, bushes, flanges, etc., which are imposed high requirements with respect to their size and shape accuracy and to the quality of surface finish which are combined with a sharp increase (by 3 – 4 times) in the productivity as compared to the known automatic machines of the same purpose having the electric motor of the same power.

Known in the present-day practice of machining workpieces shaped as solids of revolution are multispindle horizontal automatic machines, type New-Britain, Acme Gridley, Gildemeister, 1265, as well as multispindle vertical automatic machines, type Tawanwach, etc., wherein provision is made for a spindle drum with an indexing and a retaining mechanisms, tool slides carrying cutting tools, and camshafts carrying cams and flow-sheet control mechanisms of the automatic machine.

The presence of periodic-action mechanisms reduces the rigidity of the system "tool-slide-spindle-drum" and adversely effects the accuracy and the quality of surface finish; besides, dynamic loads causes rapid wear of numerous mechanisms and affects the productivity and operating reliability of the automatic machines.

There are likewise known multispindle automatic machines for machining workpieces shaped as solids of revolution, wherein cutting tool made essentially as gang tools, is fixed in position on the machine bed round the rotor which carries work spindle imparted rotation at a cutting speed from the main motion drive via the central gear wheel, and has the rotative-motion drive of its own to impart circular feed motion (cf.,e.g., USSR Inventor's Certificate No. 212,710).

In such known multispindle automatic machines the rotor carrying work spindles has its own drive independent of the main motion drive and intended to impart circular feed motion thereto.

However, the kinematic chain and construction of such an automatic machines suffer from some disadvantages.

Absence of kinematic association between the circular feed motion drive of the rotor and the main motion drive is responsible for the variable ratio between the rotor speed and the speed of spindles in the course of machining. Variation of the rotor-to-spindle speed ratio (all the spindles rotating at the same speed) and, consequently, the rate of the rotor circular feed per spindle revolution, occurs due to spindle decelerating when under load and its acceleration when under no load.

Under constant rotor speed the rate of circular feed gets sharply increased when the spindle rotation decelerates which results in further increase in the cutting force applied, and thus, in deceleration of the spindle rotation that might inflict breakage upon cutting tool resulting from the critical values of specific cutting pressure arising at the tool cutting edges.

At rather low cutting forces applied no tool breakage might occur, though the system "tool-spindle-rotor" occurs to be dynamically unstable. In such a case the rotor starts vibrating at a frequency resembling that of the spindle rotational speed which results in chatter marks appearing on the surface of the workpieces being machined that adversely affects the quality of surface finish.

Another disadvantage inherent in said known automatic machines resides in the presence of dead plays in the kinematic chain of the rotor circular feed motion. To eliminate these, it is necessary to incorporate into the kinematic chain special play-free gear trains which serve as parallel kinematic chains, thus adding much to the complicacy of the automatic machine, render the wear of its units more intensive and involve much power to be consumed.

Moreover, the system "tool-spindle-rotor" is of low reliability owing to the provision of a great number of transfer and identical mechanisms.

In said known automatic machines the central gear wheel is mounted on supports outside the machine bed. Such an arrangement of the central gear wheel involves large-diameter bearings spaced closely apart from each other. On account of a large ratio between the diameter of said bearings and the spacing thereof, their rotational accuracy is substantially affected, with the result that the central gear wheel sustains vibrations which are imparted to the machine and its spindles and, eventually, to the workpiece being machined, thus adversely affecting the accuracy of machining and the quality of surface finish thereof.

It is an essential object of the present invention to provide a multispindle automatic machine for machining workpieces shaped as solids of revolution, having such a drive for the rotor circular feed motion that would enable high dynamic stability of the system "tool-spindle-rotor."

It is another substantial object of the present invention to provide a multispindle automatic machine of the character set forth hereinabove, that would make it possible to increase cutting speeds and speeds, as well as the machining accuracy and the quality of surface finish of the workpieces being machines as compared to the known multi-spindle automatic machines of the same type.

Said and other objects are attained in such a multispindle automatic machine, wherein cutting tool made as gang tools, is fixed in position on the machine bed round the rotor that carries work spindles imparted rotation at a cutting speed from the main motion drive via the central gear wheel, and has the drive for its circular feed motion, said drive incorporating, according to the invention, a self-braking single-worm gear whose form wheel is positively locked-in with the rotor, while the worm is kinematically associated with the central gear wheel so that, irrespective of the direction of the rotor rotation, the tooth contact in the single-worm gear remains unaffected.

It is due to such a drive for the rotor circular feed motion and its kinematic association with the main motion drive that the kinematic chain of the rotor circular feed motion is made play-free, the circular feed per work spindle revolution gets stable and the whole machine is made dynamically stable, all these enabling higher cutting speeds and feeds, as well as machining accuracy and quality of surface finish to be obtained.

For a successful achievement of the aforesaid objects, it is expedient that the rotor and the central gear whell be set on the same shaft adapted to rotate alongside with the rotor and that the central gear wheel be loosely set on said shaft so as to be in constant mesh with the spindle gears and with the driving gear of the main cutting motion drive that is, in turn, engaged with the worm of the rotor circular feed motion drive through a train of change gears.

Such an arrangement of the rotor and the central gear wheel enables higher speed and rotational accuracy of the spindles to be obtained.

The present invention will now become apparent in a disclosure of an exemplary embodiment thereof, reference being directed to the accompanying drawings, wherein.

Figure 1:
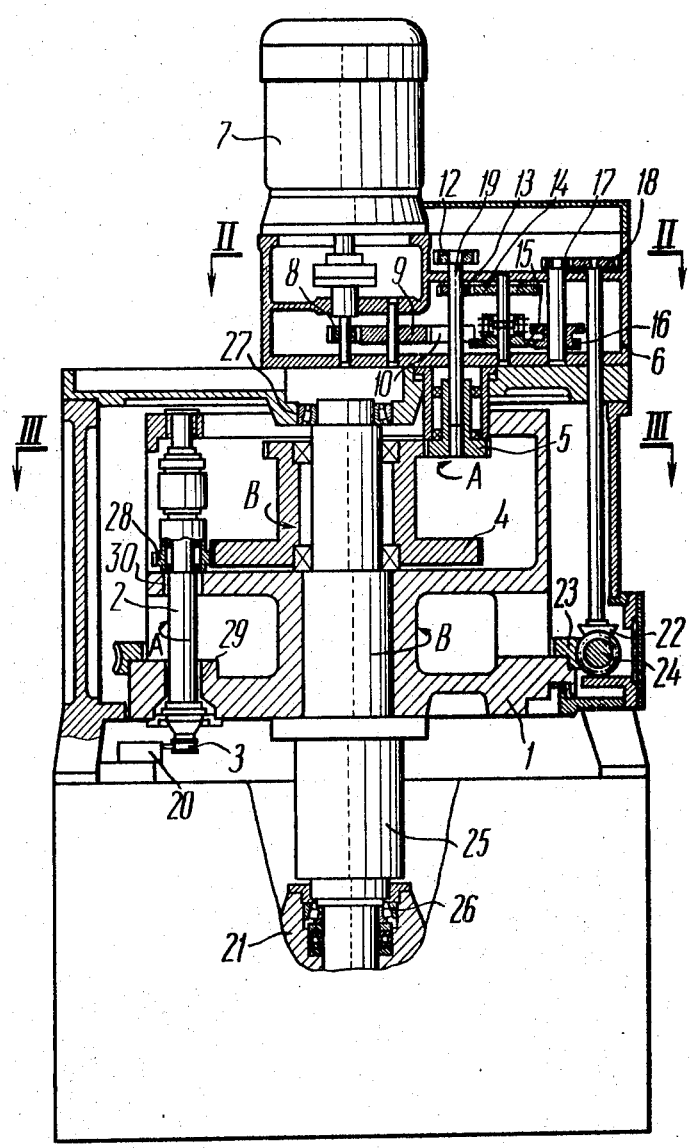
FIG. 1 is a schematic longitudinal-section view of a multispindle automatic machine, according to the invention.
Figure 3:
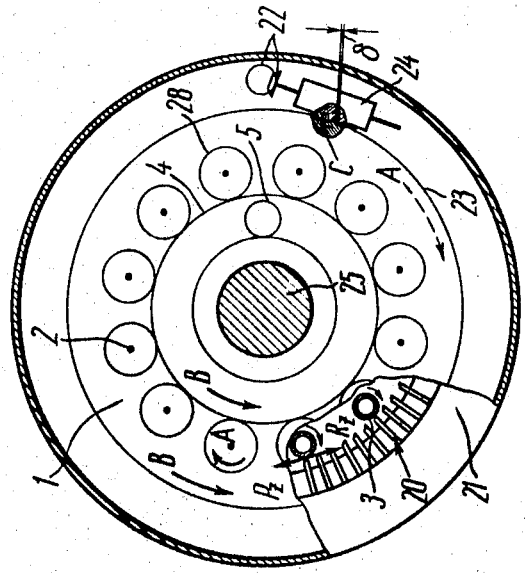
FIG. 3 is a section taken through the machine of FIG. 1 substantially along the line III—III therein.
Figure 2:
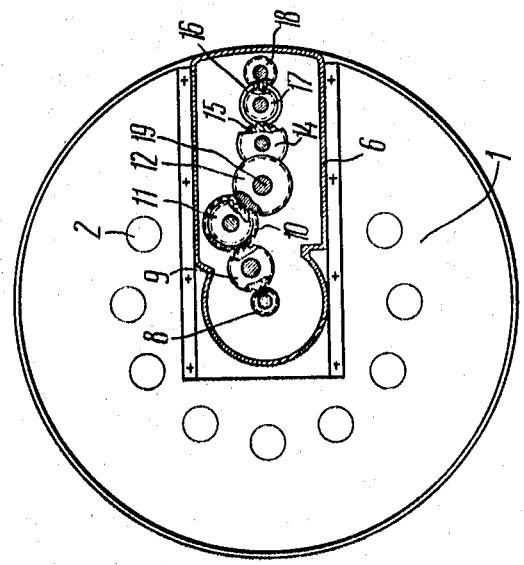
FIG. 2 is a section taken through the machine of FIG. 1 substantially along the line II—II therein.

Reference being now directed to FIGS. 1 through 3, the multispindle automatic machine for machining workpieces shaped as solids of revolution has a rotor 1 (FIGS. 1 – 3) carrying spindles 2 of workpieces 3 (FIGS. 1 and 3), said spindles being imparted rotation at a cutting speed from a motor 7 (FIG. 1) through a central gear wheel 4 and a driving gear 5 of the main cutting motion drive provided with a speed gearbox 6 (FIGS. 1, 2).

The speed gear box 6 has spur gears 8, 9, 10 and change gears 11, 12 of the main motion drive, spur gears 13, 14, 15, 16 (FIGS. 1) and change gears 17, 18 of the circular feed motion drive of the rotor 1. The driving gear 5, the change gear 12 of the main motion drive and the gear 13 of the circular feed motion drive of the rotor 1 are rigidly fixed on a shaft 19.

A cutting tool 20 made as gang tools is located round the rotor 1 and is fixed in position on a bed 21.

The circular feed motion drive of the rotor comprises a bevel gear train 22 and according to the invention, a self-braking worm gear, whose worm wheel 23 is positively locked-in with the rotor 1, while a worm 24 running in the bearings (not shown) on the bed 21, is kinematically associated with the central gear wheel 4 so that, whatever the direction of rotation of the rotor 1 the tooth contact on the single-worm gear remains unaffected.

According to the invention, the rotor 1 and the central gear wheel 4 are set on a common shaft 25 which rotates alongside with the rotor 1 in bearings 26 and 27 of the bed 21. The central gear wheel 4 (FIGS. 1, 3) is loosely set on said shaft and is in constant mesh with gears 28 on the spindles 2 and with the driving gear 5 of the main motion drive. The driving gear 5 is kinematically associated with the worm 24 of the circular feed motion drive of the rotor 1 via the change gears 17 and 18 (FIGS. 1, 2).

Other essential units of the automatic machine indispensable for its normal functioning, such as autooperator (a device for automatic loading of blanks and unloading finished parts), chip disposal mechanism, coolant system, lubricating system, etc. are left beyond the scope of the present disclosure and are not represented in the drawings for fear of obscuring the essence of the invention.

The proposed multispindle automatic machine operates as follows.

Rotation is transmitted from the motor 7 (FIGS. 1) via the spur gears 8, 9, 10 of the speed gearbox 6, the change gears 11 and 12 of the main motion drive (serving as the speed variator for the spindles 2) to the shaft 19 positively interlinked with the driving gear 5. From the latter rotation is further imparted to the central gear wheel 4 which in turn translates rotation at a cutting speed via the gears 28 to the spindles 2 carrying the workpieces 3 under machining.

The workpieces 3 (blanks) being machined are clamped on the spindles 2 by means of any conventional means suitable for the purpose.

From the shaft 19 carrying the gear 13 motion is transmitted to the circular feed motion drive of the rotor 1 via the spur gears 14, 15, 16 and the change gears 17, 18 that serve for changing the rate of the circular feed of the rotor 1, to the bevel gear train 22 and the worm 24. The latter assigns rotational speed to the worm wheel 23 mating therewith and to the rotor 1 positively interconnected to the said worm wheel. The spindles 2 rotate in the same direction throughout the machining process. In the herein-considered exemplary embodiment the direction of the spindle rotation is assumed to be clockwise (direction A).

The rotor may rotate in either direction.

Let us assume the rotor 1 to run counterclockwise (direction B).

With the spindles 2 rotating in the direction A the central gear wheel 4 will rotate counterclockwise (in the direction B). The drag torque of the spindles 2 will cause the rotor 1 to turn in the direction B (FIG. 3) this being due to friction of the spindles against their bearings 29 and 30 (FIG. 1) located in the rotor 1.

The higher the drag force applied the higher the drag torque causing the rotor 1 to turn. In the limiting case the spindles 2 will be dead-braked. This being the case, the rotor 1 tends to rotate at the speed of the central gear wheel 4 in the direction B. In a real case, the spindles are not dead-braked, and the rotor own speed is much lower the rotational seed of the central gear wheel 4, but is still high enough to outrun the rotation of the worm 24. That is why the worm 24 serves as a checking unit capable of assigning rotational speed to the rotor 1. The amount of backlash δ between the teeth of the worm wheel 23 and of the worm 24 defines the work of the worm wheel 23 as the driving link in the worm gear. Besides, the contact of the teeth of the worm wheel 23 and of the worm 24 being engaged with each other occurs only on the surface C.

When the workpiece 3 gets in contact with the tool of the gang tools 20 in the course of rotation of the rotor 1, the cutting speed $P_z$ thus arises, whose reaction $R_z$ applied to the rotor 1 is directed in the same direction as the circular feed motion of the rotor 1. Inasmuch as the direction of rotation of the rotor 1 under the action of the reaction $R_z$ of the cutting force coincides with the main motion (without cutting), the tooth contact of the worm wheel 23 and of the worm 24 remains on the surface C unaffected, while the backlash δ remains on the side opposite to the direction of rotation of the rotor 1, which precludes any strikes in the worm gear under the action of cutting forces, thereby enabling high dynamic stability of the system "tool-spindle-rotor." This, in turn, makes it possible to increase cutting speed with respect to steel up to 300 m/min.

Besides, the machined surfaces of workpieces feature high-precision accuracy of geometrical shape and size (ovality or taper up to 0.02 mm) and surface finish irregularities $R_a = 1.2 - 2.5$ mcm ($R_a$ being a mean absolute error of surface finish).

It is also practicable that the rotor 1 rotates in the direction A (i.e., clockwise). As a result, the worm 24 gets the dribing link of the warm gear, while the contact of the engaged teeth of the worm wheel 23 and of the worm 24 remain unaffected and occurs on the same surface C.

The latter case is especially applicable for small allowances for finish machining of workpieces. The effect of the cutting forces $P_z$ remains the same also in this case, the reaction $R_z$ being applied in the direction of the tooth contact, not to the backlash $\delta$.

Thus, whatever, the direction of the rotor circular feed motion, the dynamic stability of the system "tool-spindle-rotor" is attained in the course of machining.

The hereinbefore-considered vertical arrangement of the automatic machine by no means rules out the horizontal arrangement thereof with which the automatic machine can operate as much successfully.

What I claim is:

1. In a multispindle automatic machine for machining workpieces shaped as solids of revolution, comprising in a combination: a bed; a rotor with work spindles; cutting tool made as gang tools located on said bed round said rotor and fixed in position; a main cutting motion drive imparting rotation at a cutting speed to said work spindles via a central gear wheel; a means for loading workpieces and unloading finished parts; a rotative drive for said rotor carrying said work spindles to receive circular feed motion, said drive comprising a self-braking single worm gear having a worm wheel positively locked-in with said rotor, and a worm kinematically associated with said central gear wheel in such a way that, whatever the direction of rotation of said rotor the tooth contact in said single-worm gear remains unaffected, thus establishing high rigidity of the system "tool-spindle-rotor" in the cutting process.

2. A multispindle automatic machine as claimed in claim 1, wherein the rotor and the central gear wheel are set on the same shaft; said shaft being adapted for rotating alongside with said rotor; said central gear wheel loosely set on said shaft being in constant mesh with the gears of the spindles and with the driving gear of the main cutting motion drive; said driving gear of the main cutting motion drive being kinematically associated with the worm of the rotor circular feed motion drive via a train of change gears.

* * * * *